United States Patent
Barthelet (10) Patent No.: US 8,205,450 B2
(45) Date of Patent: Jun. 26, 2012

(54) METHOD OF OPERATING AN ELECTRICALLY ASSISTED TURBOCHARGER AND A BOOSTING DEVICE

(75) Inventor: Pierre Barthelet, Remiremont (FR)

(73) Assignee: Honeywell International Inc., Morristown, NJ (US)

( * ) Notice: Subject to any disclaimer, the term of this patent is extended or adjusted under 35 U.S.C. 154(b) by 973 days.

(21) Appl. No.: 11/579,354

(22) PCT Filed: May 7, 2004

(86) PCT No.: PCT/EP2004/004900
§ 371 (c)(1), (2), (4) Date: Aug. 27, 2008

(87) PCT Pub. No.: WO2005/108755
PCT Pub. Date: Nov. 17, 2005

(65) Prior Publication Data
US 2009/0000298 A1    Jan. 1, 2009

(51) Int. Cl.
*F02B 33/44* (2006.01)
(52) U.S. Cl. ........................................................ 60/608
(58) Field of Classification Search .................. 60/608; 180/65.21, 65.26; 123/179.5
See application file for complete search history.

(56) References Cited

U.S. PATENT DOCUMENTS

| | | | | |
|---|---|---|---|---|
| 4,745,755 A * | 5/1988 | Kawamura | ...................... | 60/608 |
| 4,958,497 A * | 9/1990 | Kawamura | ...................... | 60/608 |
| 5,678,407 A * | 10/1997 | Hara | ................ | 60/608 |
| 5,906,098 A | 5/1999 | Woollenweber et al. | | |
| 6,205,787 B1 | 3/2001 | Woollenweber et al. | | |
| 6,233,935 B1 * | 5/2001 | Kahlon et al. | ............... | 60/605.1 |
| 6,256,993 B1 | 7/2001 | Halimi et al. | | |
| 6,659,212 B2 * | 12/2003 | Geisse et al. | ............. | 180/65.225 |
| 6,684,863 B2 * | 2/2004 | Dixon et al. | .................... | 123/565 |
| 6,705,084 B2 * | 3/2004 | Allen et al. | ...................... | 60/608 |
| 7,137,253 B2 * | 11/2006 | Furman et al. | .................. | 60/608 |
| 7,315,778 B1 * | 1/2008 | Kumar et al. | .................. | 701/104 |
| 7,367,189 B2 * | 5/2008 | Ishiwatari | ....................... | 60/608 |
| 7,434,399 B2 * | 10/2008 | Ishiwatari | ....................... | 60/608 |
| 2002/0116925 A1 * | 8/2002 | Hampson et al. | ............ | 60/605.1 |

FOREIGN PATENT DOCUMENTS

| | | |
|---|---|---|
| DE | 10203974 | 8/2003 |
| EP | 1391595 | 2/2004 |

OTHER PUBLICATIONS

Honeywell PCT ISR PCT/EP2004/04900.

* cited by examiner

*Primary Examiner* — Thomas Denion
*Assistant Examiner* — Cameron Setayesh
(74) *Attorney, Agent, or Firm* — Brian Pangrle (57) ABSTRACT

A method of operating a turbocharger is provided, wherein the turbocharger comprises a compressor for compressing inlet air to be supplied to an internal combustion engine and an exhaust gas turbine for driving said compressor. The turbocharger further comprises an electric motor for driving said compressor operable by an electric supply system including an alternator and an electric energy storage device. A connection between said alternator and said electric energy storage device is disconnectable by a switch. According to the present invention, the method comprises the following steps:
detecting a transient condition, wherein said internal combustion engine is required to be accelerated;
supplying electric energy to said electric motor only from said electric energy storage device at the beginning of said transient condition until a predetermined state is reached;
supplying electric energy to said electric motor from the electric supply system after said predetermined state is reached.

17 Claims, 10 Drawing Sheets

METHOD OF OPERATING AN ELECTRICALLY ASSISTED TURBOCHARGER AND A BOOSTING DEVICE

The present invention relates to a turbocharger system and a boosting system and, in particular, to a method of operating a turbocharger and a boosting device.

It is known from the state of the art to provide an internal combustion engine for vehicles with a turbocharger system so as to increase the output of said internal combustion engine and in order to reduce the fuel consumption while maintaining a sufficient performance of the vehicle. Such a known turbocharger system employs a compressor driven by a turbine which, in turn, is driven by exhaust gas discharged from the internal combustion engine. The compressor increases the pressure of inlet air supplied to combustion chambers of the internal combustion engine. Thereby, the power output of the internal combustion engine and an overall efficiency are increased.

Furthermore, it is known from the state of the art to provide an internal combustion engine with a boosting device which comprises a compressor which is driven by e.g. an electric motor.

In such a turbocharger or boosting system, a control is necessary in order to adapt the operational condition of the turbocharger system to those of the internal combustion engine.

It is the object of the present invention to provide a method of operating a turbocharger and a boosting device which increases the performance and functionalities of the overall system of the internal combustion engine and which improves the response behaviour thereof.

The object is solved by a method having the combination of the features of claim 1 or claim 12. Further advantageous developments are defined in the dependent claims.

According to a first aspect of the present invention, a method of operating a turbocharger is provided, wherein the turbocharger comprises a compressor for compressing inlet air to be supplied to an internal combustion engine and an exhaust gas turbine for driving said compressor. The turbocharger further comprises an electric motor for driving said compressor operable by an electric supply system including an alternator and an electric energy storage device. A connection between said alternator and said electric energy storage device is disconnectable. According to the present invention, the method comprises the following steps:
detecting a transient condition, wherein said internal combustion engine is required to be accelerated;
supplying electric energy to said electric motor only from said electric energy storage device at the beginning of said transient condition until a predetermined state is reached;
supplying electric energy to said electric motor from the electric supply system after said predetermined state is reached.

According to the present invention, the electric energy for driving said electric motor is exclusively supplied from said electric energy storage device at the beginning of said transient condition and not from the alternator in that case where the connection between the alternator and the energy storage device is disconnected. Thereby, an increasing load applied to the alternator is prevented which, in turn, effects that the mechanical load required for driving said alternator is not increased due to the electric energy supplied to said electric motor.

According to the basic concept of the present invention, the response behaviour of the turbocharger is improved due to an assisting power derived from the electric motor for accelerating the turbocharger in that case where the acceleration of the turbocharger is required. The improvement of the response behaviour of the turbocharger effects an improvement of the overall system operability including the internal combustion engine and the turbocharger. By disconnecting the alternator from the energy storage device such as the battery so as to prohibit an increased load to be applied to the alternator, since the electric energy is exclusively supplied from said electric energy storage device to said electric motor, the vehicle performance is improved, by avoiding parasitic drag torque due to alternator during vehicle acceleration.

Preferably, said connection between said electric energy storage device and said alternator is disconnected from the beginning of the transient condition until the predetermined state is reached. In a transient condition, said internal combustion engine is required to be accelerated. Therefore, an increased inlet air amount is to be supplied to said internal combustion engine from said turbocharger. This results in the requirement to accelerate the rotational speed of the turbocharger in a short period of time. Such an acceleration in a short period of time can be assisted by the electric motor by supplying electric energy to said electric motor. However, at the beginning of the transient condition a high quantity of electric power is required to accelerate the turbocharger. Disconnecting the connection between said electric energy storage device and said alternator from the beginning of the transient condition effects that the electric power is not derived from the alternator but from the electric energy storage device only. The disconnection of said connection is maintained until the predetermined state is reached so as to prevent a state of charge of said electric energy storage device to fall below a minimum state of charge or to prevent an overload with respect to a current from the battery which is only allowable over a short period of time.

Preferably, said predetermined state is reached after the elapse of a predetermined time period from the beginning of the transient condition. This predetermined time period can be set in accordance to the property of said electric energy storage device. Any breaking or overload of said electric energy storage device can be prevented in a simple manner.

Preferably, said predetermined time period is substantially 1 second. In the usual operation of the internal combustion engine, the transient condition lasts for about 1 second. Furthermore, the electric power supplied from said electric energy storage device can be maintained over such a period without causing any damage at the electric energy storage device. However, the period of time can be set to any other appropriate predetermined period as long as the effects of the present invention are achieved. Also, the predetermined time period can be set variable depending on other conditions or values.

Preferably, a rotational speed of said internal combustion engine is detected and said predetermined state is a predetermined rotational speed of said internal combustion engine. That is, the transient condition is assumed to be terminated after a predetermined rotational speed of said internal combustion has been reached. Furthermore, the alternator is able to generate a sufficient amount of electric energy to meet the requirements of the power to be supplied to the electric motor. Preferably, said alternator is driven by said internal combustion engine and generates electric energy for the electric supply system. Furthermore, said alternator is capable of charging said electric energy storage device when said connection between said electric energy storage device and said alternator is enabled.

Preferably, a state of charge of said energy storage device is monitored and said connection between said electric energy storage device and said alternator is reconnected in case that said state of charge is smaller than a predetermined state of charge. By reconnecting the connection between said electric energy storage device and said alternator in case that said state of charge is smaller than a predetermined state of charge, the damage of said electric energy storage device can be prevented which results from the fact that the state of charge is smaller than a critical lower limit. Furthermore, a failure of the operation of said electric motor for assisting said turbocharger is prevented.

Preferably, a power output capacity of said alternator is monitored and said connection between said electric energy storage device and said alternator is reconnected when said power output capacity of said alternator is higher than the demand of said electric motor and remaining consumer loads derived from the electric power supply system. By reconnecting said connection when the power output capacity of said alternator is higher than a predetermined value any failure in supplying electric energy to said electric motor can be prevented. Furthermore, the power output of said alternator indicates a condition where supplying the electric energy exclusively from said electric energy storage device is no longer necessary.

Preferably, said connection between said electric energy storage device and said alternator is connectable and disconnectable by a switch. A switch can provide open or closed states so as to enable the connection and disconnection between said electric energy storage device and said alternator. Furthermore, such a switch is capable of being controlled by control signals transmitted from a control circuit.

Preferably, said compressor and/or said exhaust gas turbine comprises a variable nozzle wherein said nozzle is adjusted based on the state of said connection between said electric energy storage device and said alternator. The state of said connection indicates the transient condition or at least a condition where the turbocharger is to be accelerated, and the adjusting of the variable nozzle to the present state enhances the efficiency and performance of the turbocharger and the overall system.

According to a second aspect of the present invention, a method of operating a boosting device is provided wherein the boosting device comprises a compressor for compressing inlet air to be supplied to an internal combustion engine and an electric motor for driving said compressor operable by an electric supply system including an alternator and an electric energy storage device, wherein a connection between said alternator and said electric energy storage device is disconnectable. Furthermore, said method comprises the following steps: detecting a transient condition wherein said internal combustion engine is required to be accelerated, supplying electric energy to said electric motor only from said electric energy storage device at the beginning of said transient condition until a predetermined state is reached, supplying electric energy to said electric motor from the electric supply system after said predetermined state is reached.

According to the second aspect of the present invention, the boosting device is an electrically driven compressor which can be used stand-alone or in combination with an additional exhaust gas driven turbocharger. With the second aspect of the present invention, the same effects can be achieved as with the first aspect of the present invention. In particular, the method of operating the electric boosting device provides the same advantages irrespective of the provision of the exhaust gas turbine for driving a turbocharger or the provision of the compressor only which is driven by the electric motor.

Preferably, said boosting device further comprises an exhaust gas turbine for driving said compressor. Thereby, the boosting device is usable as a turbocharger and the advantage of a turbocharger is provided in the boosting system.

Each of the above-explained preferable forms of the method of operating a turbocharger according to the first aspect of the present invention are applicable to the method of operating the boosting device according to the second aspect. Thereby, the same effects and advantages are achieved with the first aspect and the second aspect of the present invention.

In the following, preferred embodiments and further technical solutions are described in detail with reference to the accompanying drawings.

In the following, the structure of the internal combustion engine along with associated elements including a turbocharger and the control system is explained with reference to FIG. 1 and FIG. 2.

Figure 1:
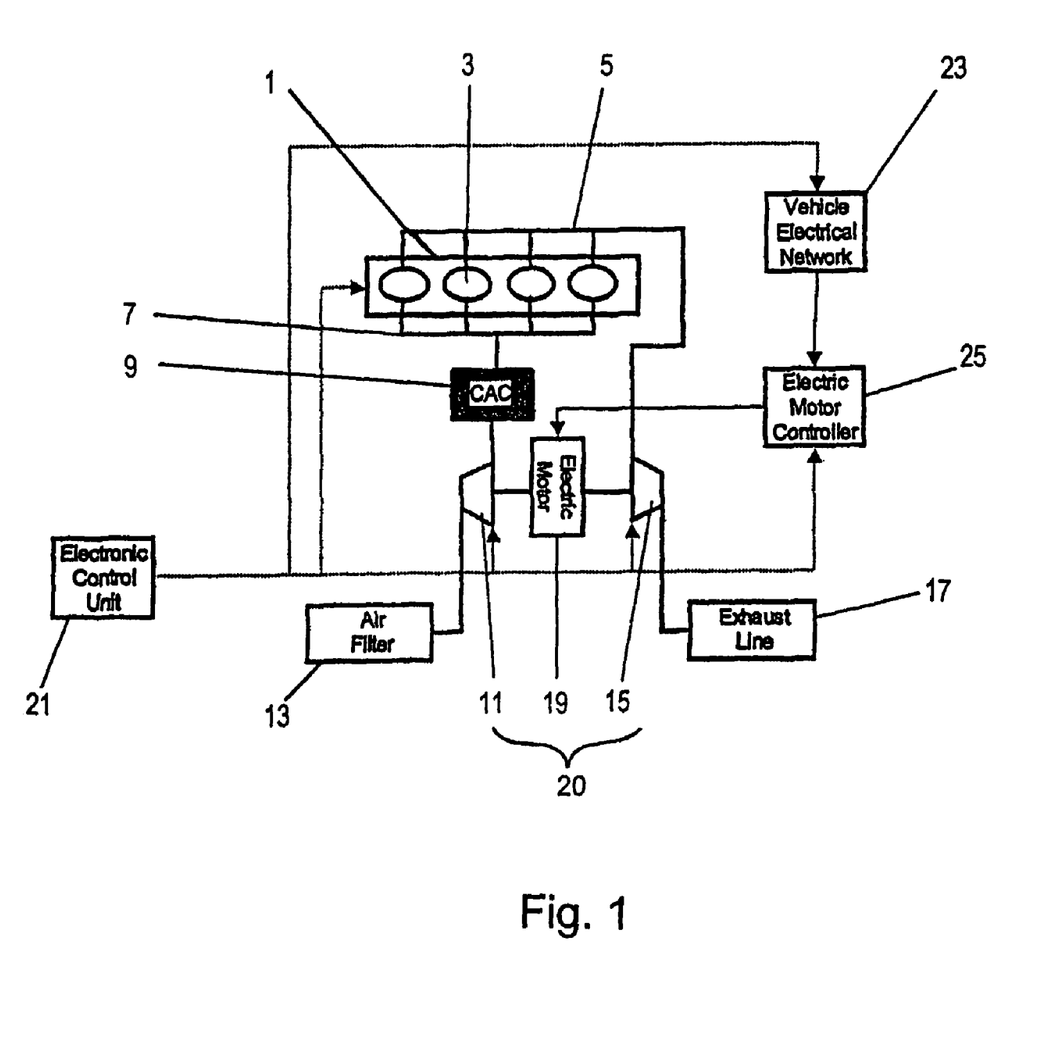
FIG. 1 shows a schematic illustration of the overall system comprising the internal combustion engine, the turbocharger and the associated control system for controlling the same according to the present invention.

As shown in FIG. 1, the structure comprises an internal combustion engine 1 which comprises combustion chambers 3 (four combustion chambers according to FIG. 1) each of which is connected to an inlet air line 7 and an exhaust line 5. A turbocharger 20 is connected to the internal combustion engine 1 through said inlet air line 7 and said exhaust line 5. In particular, the turbocharger 20 comprises a turbine 15 and a compressor 11 which are mounted on the same shaft. Exhaust gas discharged from the internal combustion engine 1 through said exhaust line 5 is supplied to the turbine 15 of the turbocharger 20 so as to drive the turbine 15 rotationally. Thereby, the turbine drives the compressor 11 of the turbocharger 20. The compressor 11 draws air from the atmosphere through an air filter 13, compresses said air and supplies this compressed air via a charge air cooler 9 towards the combustion chambers 3 through said inlet air line 7.

The internal combustion engine 1 further comprises a fuel supply system for supplying fuel to each of the combustion chambers 3 (not shown). The air introduced to the combustion chambers 3 of the internal combustion engine 1 is mixed with supplied fuel and burned so as to generate power in a known manner. The exhaust gas which is produced by the combustion is, in turn, passed towards the turbine 15 of the turbocharger 20. The exhaust gas is directed to an exhaust line 17 so as to discharge the same to the atmosphere.

The turbocharger 20 further comprises an electric motor 19 which is mounted so as to drive the shaft on which the turbine 15 and the compressor 11 are mounted. The electric motor 19 is capable of driving and accelerating the turbocharger including the turbine wheel of the turbine 15 and the compressor wheel of the compressor 11. The electric motor 19 is supplied by AC electric power by the electric motor controller 25. This electric motor controller 25 is connected to the vehicle electrical network 23, which supplies the necessary DC electric power and to the electronic control unit 21 which send the electric motor activation command when needed.

Furthermore, the structure comprises an electronic control unit (ECU) 21 for controlling the operation of the internal combustion engine 1 and of the turbocharger 20 and the like. The electronic control unit 21 receives sensor signals from the internal combustion engine and from the turbocharger 20 so as to monitor the operational conditions thereof. In addition, the structure comprises a vehicle electrical network 23 which serves as an electric supply system, as described with reference to FIG. 2 below. This vehicle electrical network is linked to the ECU.

Figure 2:
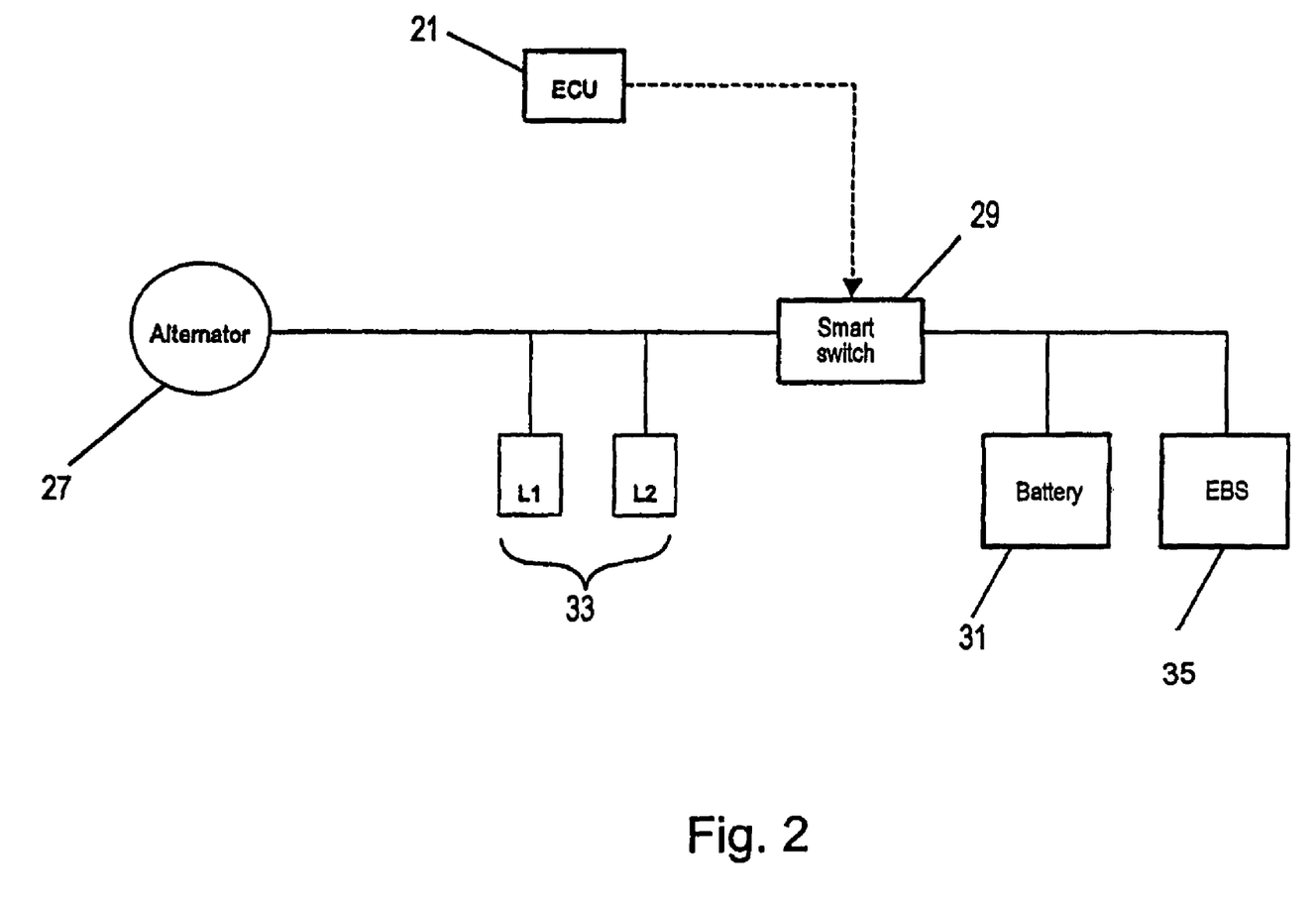
FIG. 2 shows a schematic illustration of the electric supply system to which the method according to the present invention is applicable.

The vehicle electrical network 23 according to the present invention is shown in more detail in FIG. 2. The vehicle electrical network 23 comprises an alternator 27, a smart switch 29, a battery 31 which serves as an electric energy storage device and an electric boosting system 35 which includes the electric motor 19 of the turbocharger 20 and its electronic controller 25.

The alternator 27 is driven by a mechanic power output from said internal combustion engine 1. The alternator 27 generates electric energy by being driven by the internal combustion engine 1. The electric energy generated by said alternator 27 is supplied to the vehicle electrical network 23. The vehicle electrical network 23 includes further consumers 33 which consist e.g. in an electric light system L1, further electric motors L2 such as those used for power windows or sunroofs or the like.

The battery 31 is connectable with the alternator 27 such that the alternator is capable of charging the battery. Furthermore, the electric boosting system 35 is connected to the vehicle electrical network 23 and controlled by the electronic control unit 21. The electric motor 19 and its associated control electronic (electric motor controller 25) are operated on a command output from the electronic control unit 21. The electric motor controller 25 controls the supply of electric energy to said electric motor 19 depending on commands output from the electronic control unit 21 which are based on the operational conditions of the internal combustion engine 1 and/or the vehicle electrical network 23 and the like.

The smart switch 29 is interposed in the connection between the alternator 27 and the battery 31. The smart switch 29 is capable of disconnecting the connection between the alternator 27 and the battery 31. The electronic control unit 21 is in connection with the smart switch 29 so as to set said smart switch 29 to an open state or a closed state depending on the commands output from the electronic control unit 21.

Figure 3:
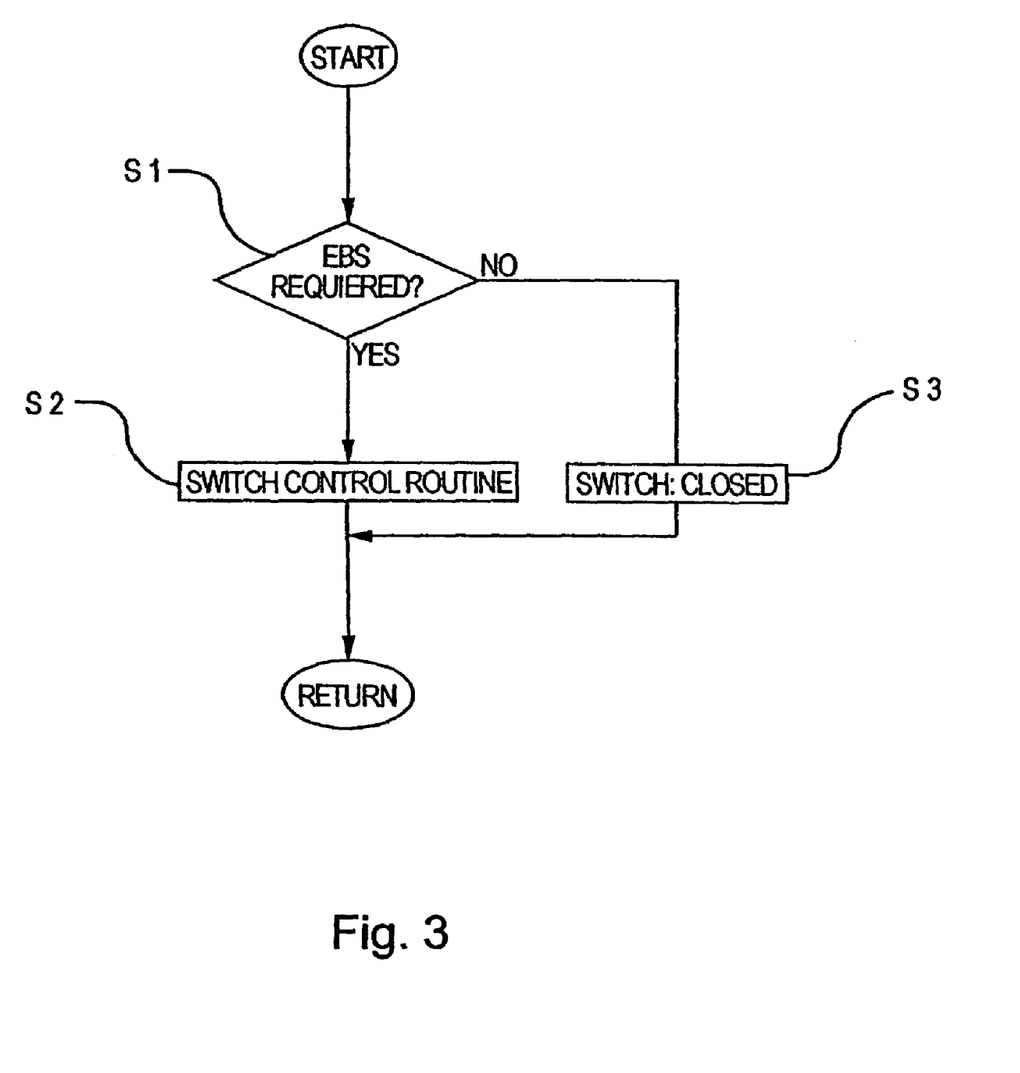
FIG. 3 is a flow chart for explaining a routine for determining the requirement of performing the switch control routine according to the present invention.
Figure 10:
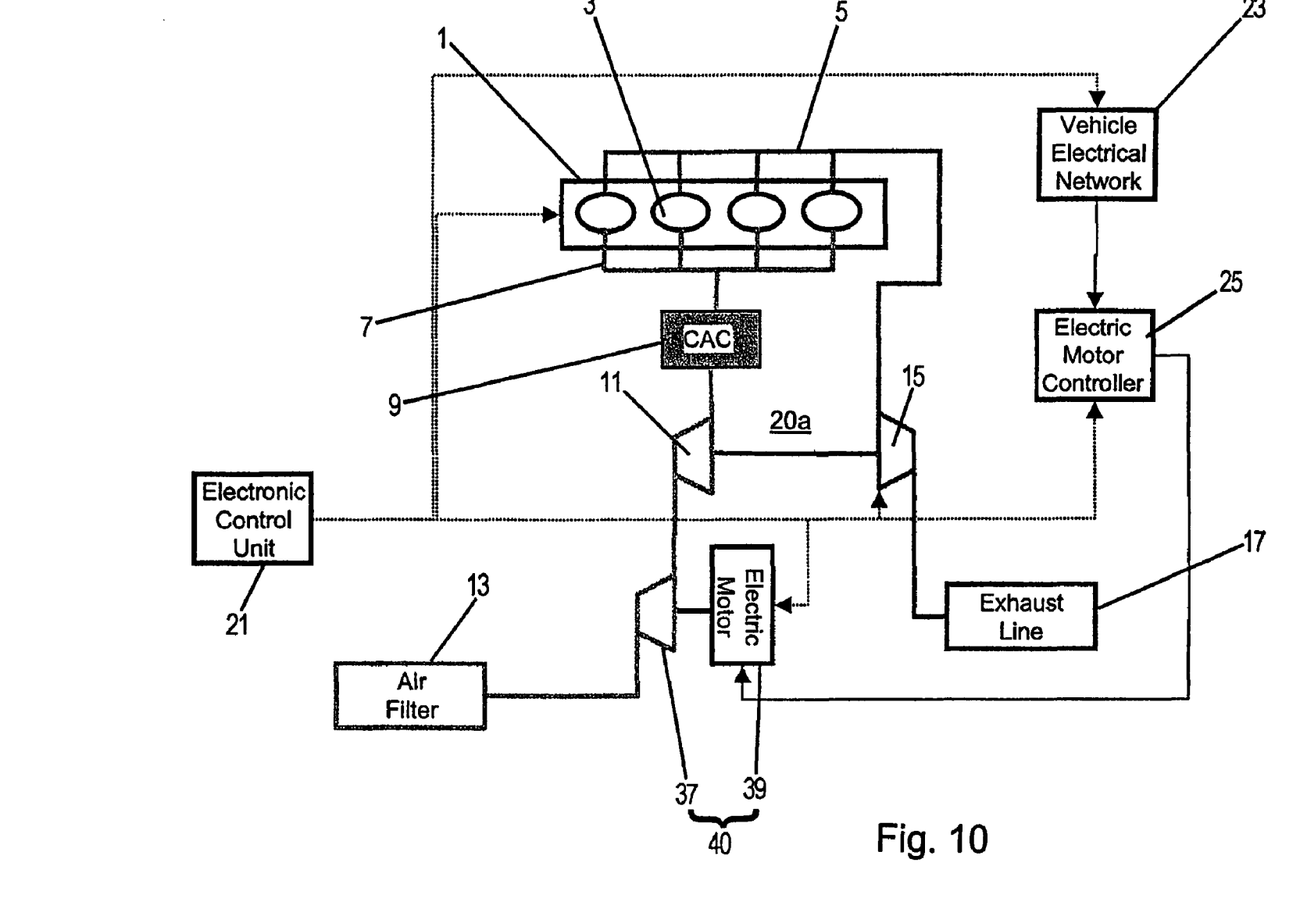
FIG. 10 shows a schematic illustration of the overall system as a modification of the system of FIG. 1 with a turbocharger system which includes an electrically driven boosting device according to the present invention to which the method according to the first to fifth embodiments is applicable.

A preliminary routine for determining the requirement of operating the electric booster system applicable to the structure shown in FIG. 1, FIG. 2 and the modification of FIG. 10 is shown in FIG. 3. The flow chart shown in FIG. 3 is a routine which is performed by the electronic control unit 21 in a repeated manner during the operation of the system.

In step S1, the electronic control unit 21 determines, whether the operation of the electric booster system is required or not. This determination is based on the operational condition of the internal combustion engine 1 and of the vehicle electrical network 23. If in step S1 'NO' is obtained, the switch 29 is set to the closed position in step S3. Thereby, the connection between the alternator 27 and the battery 31 is established. That is, the electric motor 19 of the electric booster system 35 can be supplied by electric energy derived from the alternator 27 and the battery 31, since both the alternator 27 and the battery 31 are connected to the vehicle electrical network 23. Then the routine returns to the start and is repeated.

If in step S1 'YES' is obtained, the routine proceeds to step S2, in which a switch control routine is carried out. The switch control routine according to step S2 is shown in the following Figures and explained in detail below.

Figure 4:
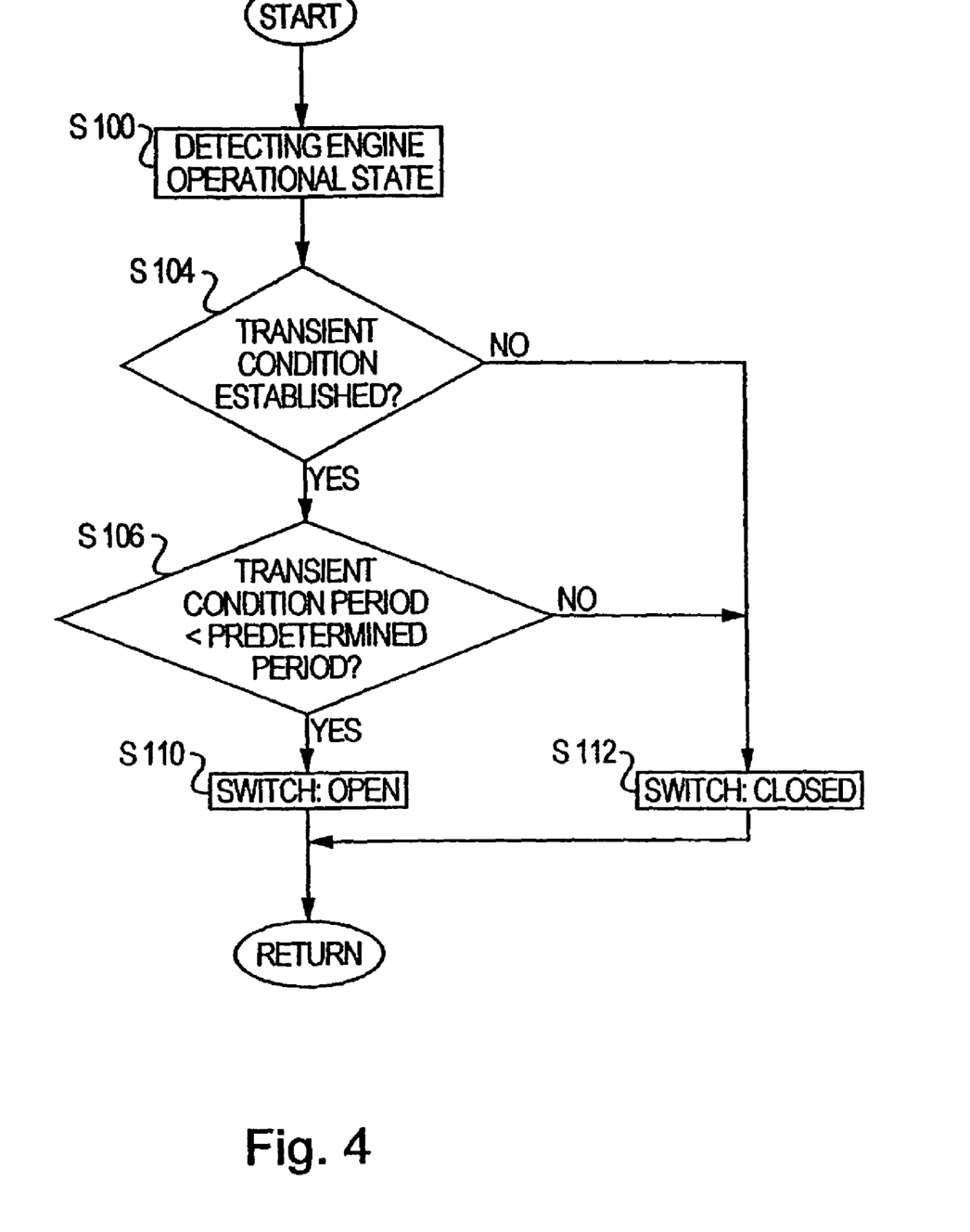
FIG. 4 is a flow chart for explaining the switch control routine according to a first embodiment of the present invention.

The switch control routine is explained based on FIG. 4 according to a first embodiment of the present invention.

In step S100 the operational state of the internal combustion engine is detected. That is, the electronic control unit derives sensor signals such as rotational speed signals, an accelerator position sensor, and the like, so as to determine the engine operational state.

In step S104 it is determined, whether a transient condition is established or not. That is, the electronic control unit 21 evaluates the signals derived from the sensors and judges that the rotational speed of the internal combustion engine 1 is required to be accelerated. If such a requirement for an accelerated rotational speed of the internal combustion engine 1 is judged by the electronic control unit 21, it is determined that a transient condition is established so as to obtain 'YES' in step S104. In case that the electronic control unit 21 does not judge that the requirement of an acceleration of the internal combustion engine 1 is present, in step S104 'NO' is obtained. If in step 104 'NO' is obtained, the routine proceeds to step S112. In step S112 the switch is set to the closed position. Thereby, the connection between the alternator 27 and the battery 31 is established. Furthermore, the routine proceeds to 'RETURN' so as to start the routine again.

If in step S104 'YES' is obtained, the routine proceeds to step S106. In step S106, it is determined, whether the transient condition period is less than a predetermined period or not. If the transient condition period lasts for less than a predetermined period, in step S106 'YES' is obtained. In case that the transient condition period exceeds the predetermined period, in step S106 'NO' is obtained.

If in step S106 'NO' is obtained, the routine proceeds to step S112. In step S112 the switch 29 is set to the closed position. Thereby, the connection between the alternator 27 and the switch 29 is established. Furthermore, the routine proceeds from step S112 to return the routine. If in step S106 'YES' is obtained, the routine proceeds to step S110. In step S110, the switch is set to the open position. That means, that the connection between the alternator 27 and the battery 31 is disconnected. The routine proceeds from S110 to return to the start of the routine.

The routine shown in FIG. 4 is repeated in predetermined time intervals so as to control the position of the switch 29 based on the determination of a transient condition in step S104 and based on the transient condition period in step S106.

According to the basic concept of the present invention, the switch is closed, if no transient condition is established. If a transient condition is established, the switch 29 is set to the open position in case that the transient condition period is less than a predetermined period. According to the present embodiment the switch is closed in step S112 in case where the transient condition period exceeds a predetermined period.

This predetermined period can be freely set. However, the predetermined period according to the present embodiment is 1 second.

Figure 5:
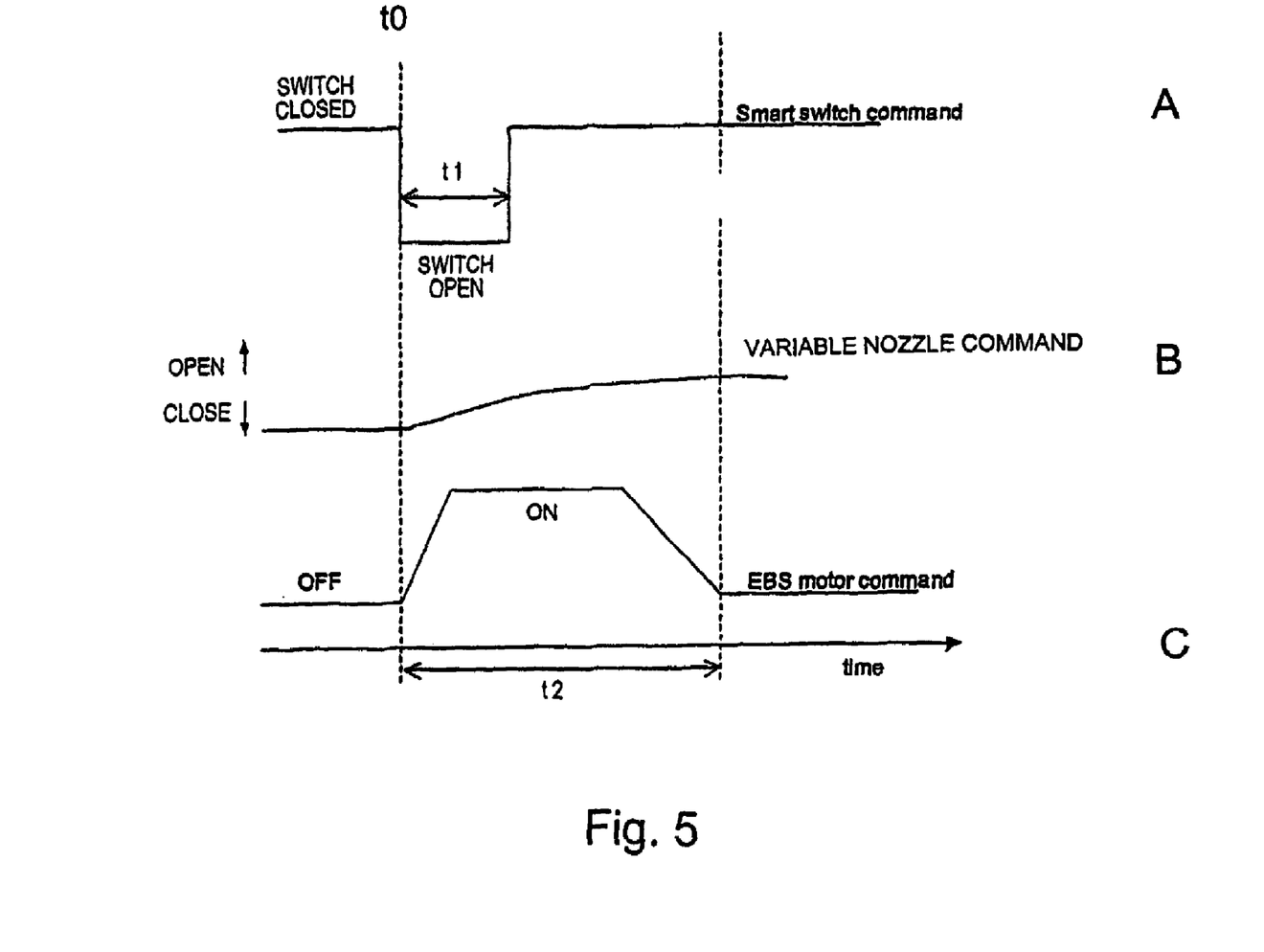
FIG. 5 is a time chart for illustrating control operations performed by the method according of the present invention.

The operational behaviour of the electric booster system including the switch is shown in a time chart in FIG. 5. Section A of FIG. 5 shows the position of the switch 29 with respect to time. Section B of FIG. 5 shows the variable nozzle command output from the electronic control unit 21 with respect to time. Section C of FIG. 5 shows the electric booster system motor command with respect to time output from the electric motor controller 25 based on signals output from the electronic control unit 21.

At a time t0, the switch 29 is closed and the electric booster system motor command is switched off. In case where the control method according to the present invention determines that a transient condition has established, the electric booster system motor command is switched on over a ramp as shown in the time period t2 in section C. Furthermore, if the transient condition is determined by the control method according to the present invention, the switch is opened over a time period t1 shown in section A of FIG. 5. that is, the connection between the alternator 27 and the battery 31 is disconnected over the time period t1. In this time period t1, the electric energy supplied to the electric motor 19 of the turbocharger 20 is exclusively supplied by the battery 31. After the time period t1 has elapsed, the smart switch is closed as can be seen in section A of FIG. 5. That means that the connection between the alternator 27 and the battery 31 is reconnected. Therefore, the alternator 27 is capable of supplying electric energy to the electric booster system 35 and to the battery 31 so as to charge the same. During the activation of the electric booster system in a time period t2, the variable nozzle command is set to a sufficient value in correspondence to the requirements of the turbocharger 20 and the internal combustion engine 1 as can be seen in section B of FIG. 5. At the end of the time period t2, shown in section C in FIG. 5, the electric booster system motor command is decreased by a ramp so as to reach an 'OFF' state of the electric booster system at the end of the time period t2.

Figure 6:
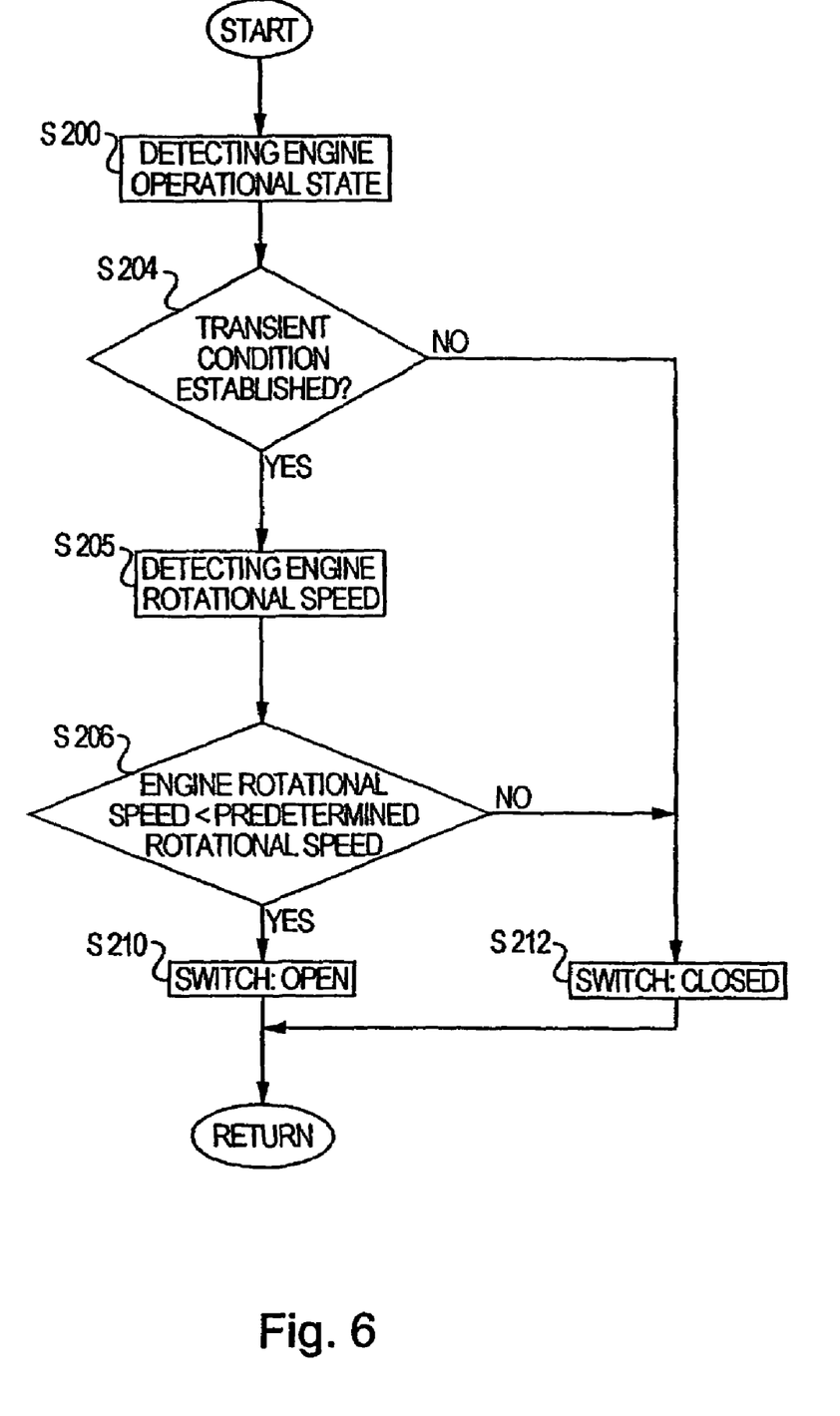
FIG. 6 is a flow chart for explaining a switch control routine according to a second embodiment of the present invention.

The switch control routine according to the second embodiment of the present invention is explained based on FIG. 6. The routine shown in FIG. 6 is similar to that shown in FIG. 4, therefore only the differences between the routines shown in FIG. 4 and FIG. 6 are explained.

In the routine shown in FIG. 6, the engine operational state is detected in step S200 and it is determined in step S204, whether a transient condition is established or not. If in step S204 'NO' is obtained, the switch is set to the closed position in step S212. Then, the routine returns to the start and is repeated.

If in step S204 'YES' is obtained, in step S205 an engine rotational speed is detected and the routine proceeds to step S206.

In step S206, it is determined, whether the engine rotational speed is less than a predetermined rotational speed. If the engine rotational speed is less than a predetermined rotational speed, in step S206 'YES' is obtained. If the engine rotational speed is equal or higher than the predetermined engine rotational speed, 'NO' is obtained in step S206. If in step S206 'NO' is obtained, the switch is set to the closed position in step S212. Then, the routine returns to the start. If in step S206 'YES' is obtained the switch is set to the open position in step S210. Then the routine returns to the start.

The routine shown in FIG. 6 is repeatedly carried out by the electronic control unit 21.

According to the second embodiment of the present invention as shown in FIG. 6, the engine rotational speed is detected in step S205 and the switch is set to the open position in step S210 in case that the engine rotational speed is less than a predetermined rotational speed. Therefore, the switch is kept open until the rotational speed of the engine reaches a predetermined rotational speed. Since the alternator 27 is driven by the internal combustion engine 1, the rotational speed thereof should be a required rotational speed so as to enable the alternator 27 to output a predetermined electric power. Furthermore, the amount of exhaust gas discharged by the internal combustion engine 1 increases along with an increase in the rotational speed in the internal combustion engine 1. If the rotational speed of the internal combustion engine 1 reaches a predetermined rotational speed, a required amount of exhaust gas supplied to the turbine 15 of the turbocharger 20 is secured.

As long as the engine rotational speed is less than the predetermined rotational speed while the transient condition is established, the switch is kept open according to the present embodiment. If the transient condition is no longer established or the engine rotational speed reaches the predetermined rotational speed, the switch is set to the closed position.

Figure 7:
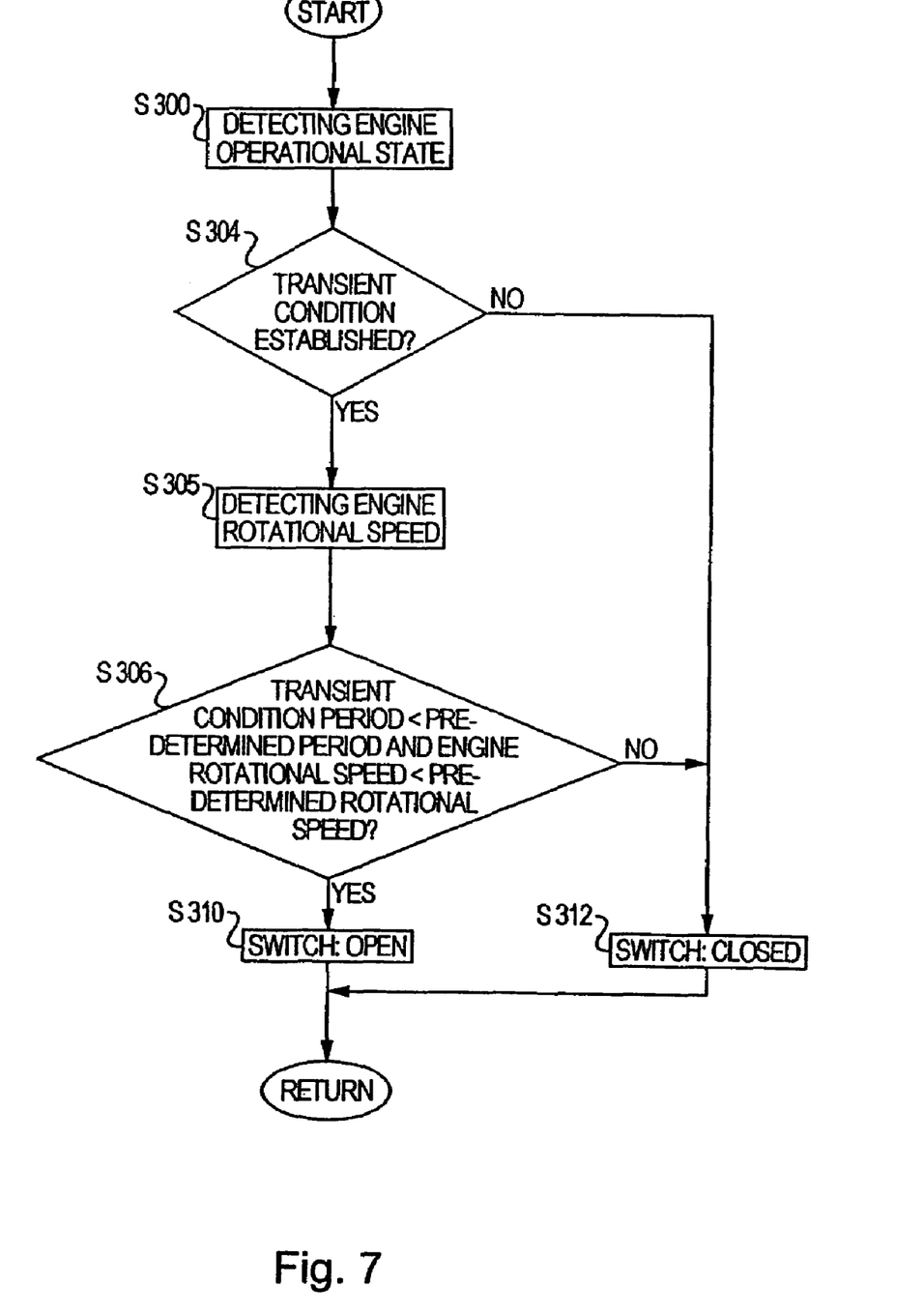
FIG. 7 is a flowchart for explaining a switch control routine according to the third embodiment of the present invention.

A third embodiment according to the present invention is explained based on the routine shown in FIG. 7.

The routine shown in FIG. 7 is similar to that shown in FIG. 4, therefore only the differences between the routines shown in FIG. 4 and FIG. 7 are explained.

In the routine shown in FIG. 7, the engine operational state is detected in step S300 and it is determined in step S304, whether a transient condition is established or not. If in step S304 'NO' is obtained, the switch is set to the closed position in step S312. Then, the routine returns to the start.

If in step S304 'YES' is obtained, in step S305 an engine rotational speed is detected and the routine proceeds to step S306.

In step S306, it is determined, whether the transient condition period is less than a predetermined period. Furthermore, in step S306, it is determined, whether the engine rotational speed is less than a predetermined rotational speed. If the transient condition period is less than a predetermined period and in addition the engine rotational speed is less than a predetermined rotational speed, in step S306 'YES' is obtained. If one of the conditions of the engine rotational speed being equal or higher than the predetermined engine rotational speed and of the transient condition period being equal or longer than the predetermined period is met, 'NO' is obtained in step S306. If in step S306 'NO' is obtained, the switch is set to the closed position in step S312. Then, the routine returns to the start. If in step S306 'YES' is obtained, the switch is set to the open position in step S310. Then, the routine returns to the start and is repeated.

The routine shown in FIG. 7 is repeatedly carried out by the electronic control unit 21.

The third embodiment forms a combination of the first embodiment and the second embodiment of the present invention. That is, in step S306 the transient condition period and the rotational speed are those determined and the switch is set to the open position in step S310 in case where the transient condition period is less than the predetermined period and, in addition, the engine rotational speed is less than a predetermined rotational speed. If one of the two conditions is not met, the switch is set to the closed position in step S312.

According to the third embodiment, the connection between the alternator 27 and the battery 31 is disconnected only in case that the two conditions according to step S306 are met. If the transient condition period exceeds the predetermined period, the switch is set to the closed position and the connection between the alternator 27 and the battery 31 is reconnected irrespective of the rotational speed with respect to the predetermined rotational speed. On the other hand, the switch is set to the closed position in step S312 if the rotational speed exceeds the predetermined rotational speed irrespective of the transient condition period with respect to the predetermined period.

Figure 8:
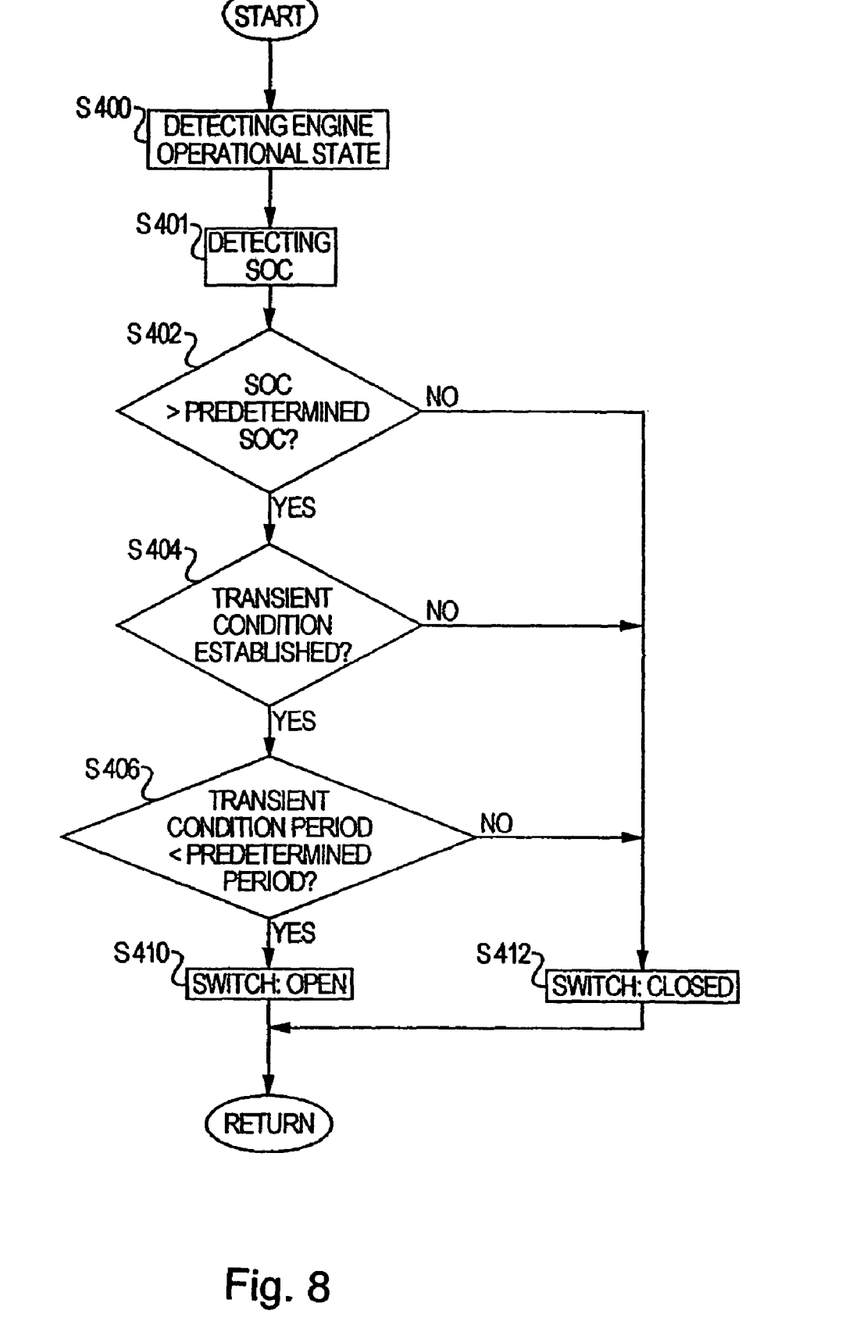
FIG. 8 is a flow chart for explaining the switch control routine according to a fourth embodiment of the present invention.

A fourth embodiment according to the present invention is explained based on the routine shown in FIG. 8.

The routine shown in FIG. 8 is similar to that shown in FIG. 4, therefore only the differences between the routines shown in FIG. 4 and FIG. 8 are explained.

In the routine shown in FIG. 8, the engine operational state is detected in step S400. Then, the routine proceeds to step S410 in which the state of charge of the battery 31 (SOC) is detected. Then, the routine proceeds to step S402.

In step S402, it is determined, whether the state of charge of the battery 31 is higher than a predetermined state of charge. If the state of charge is higher than a predetermined state of charge, 'YES' is obtained in step S402. If the state of charge is not higher than the predetermined state of charge, 'NO' is obtained in step S402.

If in step S402 'NO' is obtained, the routine proceeds to step S412 where the switch is set to the closed position. Then, the routine returns to the start and is repeated.

If in step S402 'YES' is obtained, the routine proceeds to step S404. In step S404, it is determined whether a transient condition is established or not. If in step S404 'NO' is obtained, the switch is set to the closed position in step S412. Then, the routine returns to the start.

If in step S404 'YES' is obtained, the routine proceeds to step S406. In step S406, it is determined whether the transient condition period is less than a predetermined period or not. If the transient condition period lasts for less than the predetermined period, in step S406 'YES' is obtained. In case that the transient condition period exceeds the predetermined period, in step S406 'NO' is obtained.

If in step S406 'NO' is obtained, the routine proceeds to step S412. In step S412, the switch 29 is set to the closed position. Furthermore, the routine proceeds from step S412 to return the routine to the start and to repeat the same.

If in step S406 'YES' is obtained, the routine proceeds to step S410. In step S410, the switch is set to the open position. Then, the routine returns to the start and is repeated.

According to the fourth embodiment of the present invention, the state of charge of the battery 31 is detected and evaluated in the steps S401 and S402. Based on the result, the switch is set to the closed position in case that the state of charge of the battery 31 is not sufficient for driving the electric booster system 19 exclusively by power derived from the battery 31.

On the other hand, if the state of charge of the battery 31 is determined to be sufficient for driving the electric booster system 35 and, in particular, the electric motor 19 thereof, the switch is set to the open position so as to supply electric power for driving the electric motor 19 exclusively by the battery 31.

Figure 9:
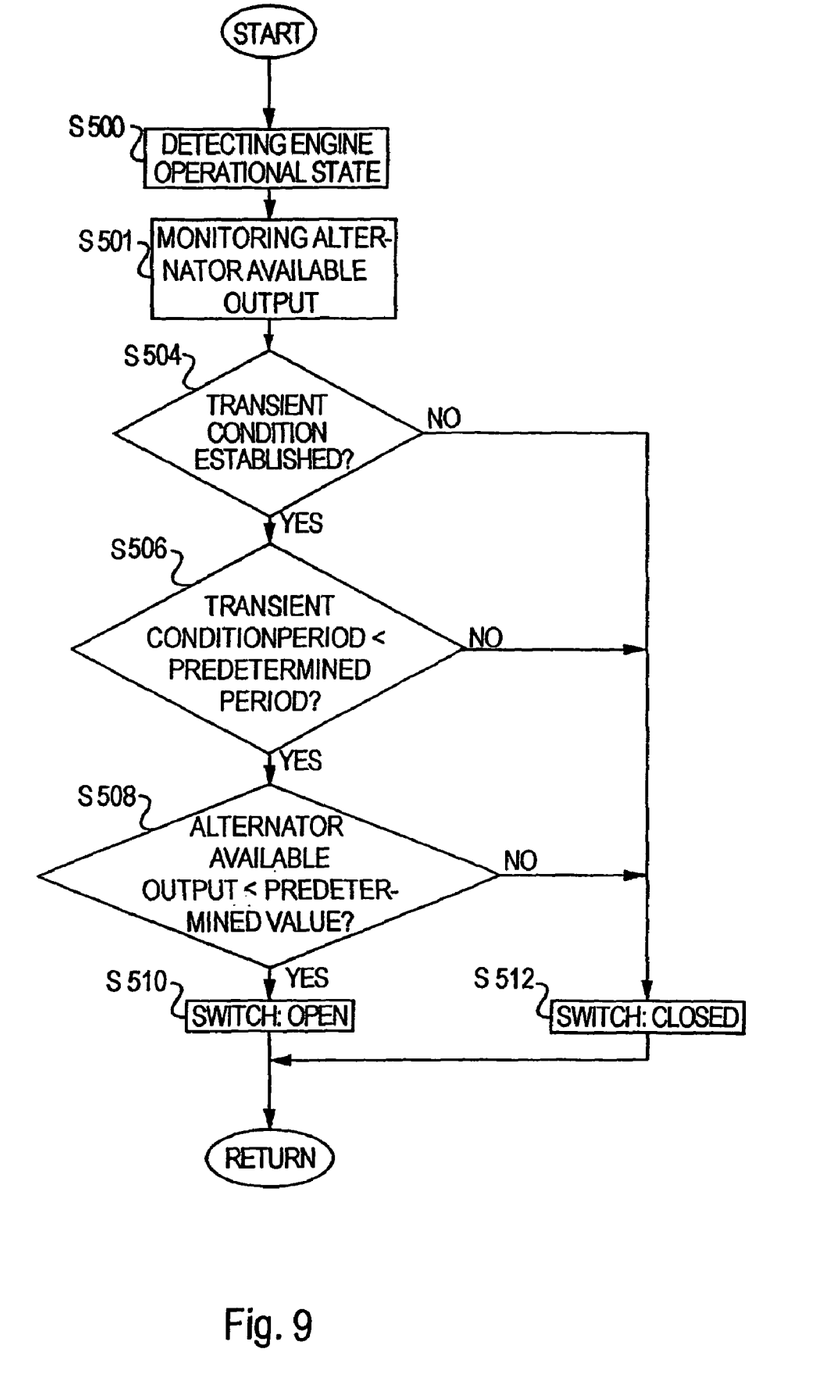
FIG. 9 is a flow chart for explaining the switch control routine according to a fifth embodiment of the present invention.

A fifth embodiment according to the present invention is explained based on the routine shown in FIG. 9.

The routine shown in FIG. 9 is similar to that shown in FIG. 4, therefore only the differences between the routines shown in FIG. 4 and FIG. 9 are explained.

In the routine shown in FIG. 9, the engine operational state is detected in step S500 and the routine proceeds to step S501. In step S501, the alternator available power output is monitored. The alternator available power output is the difference between the alternator maximum power capacity and the power consumed by consumers 33 currently connected to the electrical network. The alternator maximum power capacity can be easily obtained by a calculation performed by the ECU based on a map which includes e.g. the engine rotational speed versus the maximum power output by the alternator. The current power consumption can be as well monitored by the ECU, hence the alternator available power output can be determined by the ECU at each time.

Then, the routine proceeds to step S504. In step S504 it is determined, whether a transient condition is established or not. If the transient condition is established, 'YES' is obtained in step S504. If no transient condition is established, 'NO' is obtained in step S504.

If in step S504 'NO' is obtained, the routine proceeds to step S512 to set the switch to the closed position. Then, the routine returns to the start and is repeated. If in step S504 'YES' is obtained, the routine proceeds to step S506.

In step S506, it is determined whether the transient condition period is less than the predetermined period. If the transient condition period is less than the predetermined period, 'YES' is obtained in step S506. If the transient condition period is not less than a predetermined period, 'NO' is obtained in step S506.

If in step S506 'NO' is obtained, the routine proceeds to step S512 to set the switch to the closed position. Then, the routine returns to the start and is repeated.

If in step S506 'Yes' is obtained, the routine proceeds to step S508. In step S508 it is determined, whether the alternator available power output is lower than a predetermined value. In particular, the alternator available output is the difference between the calculated or detected alternator maximum power output capacity and the loads connected to the alternator. If the alternator available power output is lower than the predetermined value, 'YES' is obtained in step S508. If the alternator available output is not lower than the predetermined value, 'NO' is obtained in step S508.

If in step S508 'NO' is obtained, the routine proceeds to step S512, where the switch is set to the closed position. Then, the routine returns to the start and is repeated.

If in step S508 'YES' is obtained, the routine proceeds to step S510. In step S510, the switch is set to the open position. Then, the routine returns to the start and is repeated.

According to the fifth embodiment of the present invention, the alternator available power output is considered in the control of the switch 29. That is, the switch 29 is set to the closed position only if the alternator available power output is higher than a predetermined output. Otherwise, the switch is set to the open position.

Thereby, the power supply to the vehicle electric network is secured. In particular, if the switch is set to the open position, the battery 31 and electric boosting system are disconnected from the rest of the vehicle electrical network 23. Battery and EBS are only reconnected to the whole vehicle electrical network only when alternator capacity is enough to supply power to EBS and other consumers, avoiding voltage drop during EBS operation.

The invention is not limited to the above described embodiments and modifications thereof. In particular, the single structures according to the above explained embodiments and modifications thereof can be freely combined with each other.

In particular, the energy storage device 31 can be divided in at least two parts and the connection between only a part of the battery and the alternator 27 is disconnectable by said switch 29.

Furthermore, the vehicle electric network 23 can include a further electric energy storage device which can serve as an auxiliary battery. The connection between the alternator 27 the switch 29 may be such that this connection is not disconnectable so as to provide an emergency system.

In the following, a modification of the above-described embodiments is explained. According to the above first to fifth embodiments, the electrically assisted turbocharger 20 is controlled by performing the methods as shown in FIGS. 3-4 and 6-9. This turbocharger 20, as shown in FIG. 1, comprises a compressor 11 which is driven by an exhaust gas driven turbine 15 so as to increase the pressure of inlet air fed to the internal combustion engine 1. However, the method according to the above embodiments is also applicable to a boosting device which includes a compressor so as to increase the pressure of the inlet air fed to the internal combustion engine directly or through a compressor of a turbocharger which is provided in addition to the boosting device.

The structure including a boosting device and a turbocharger is shown in detail in FIG. 10. In the following description, only the differences between the structures shown in FIGS. 1 and 10 are explained.

As shown in FIG. 10, the structure comprises an internal combustion engine 1 which comprises combustion chambers 3 (four combustion chambers according to FIG. 10) each of which is connected to an inlet air line 7 and an exhaust line 5. A turbocharger 20a is connected to the internal combustion engine 1 through said inlet air line 7 and said exhaust line 5. In particular, the turbocharger 20a comprises a turbine 15 and a compressor 11 which are mounted on the same shaft. Exhaust gas discharged from the internal combustion engine 1 through said exhaust line 5 is supplied to the turbine 15 of the turbocharger 20a so as to drive the turbine 15 rotationally. Thereby, the turbine drives the compressor 11 of the turbocharger 20a.

In addition, a boosting device 40 is provided with a compressor 37 which is driven by an electric motor 39. The compressor 37 draws air from the atmosphere through an air filter 13, compresses said air and supplies this compressed air to the compressor 11 of the turbocharger 20.

Thereby, the pressure of inlet air introduced into the compressor 11 of the turbocharger 20a is boosted before entering the compressor 11.

The boosting device 40 is driven by said electric motor 39 which is mounted so as to drive the shaft on which the compressor 37 is mounted. The electric motor 39 is supplied by AC electric power by the electric motor controller 25. This electric motor controller 25 is connected to the vehicle electrical network 23, which supplies the necessary DC electric power and to the electronic control unit 21 which send the electric motor activation command when needed.

The main difference between the structure of FIG. 1 and the structure of FIG. 10 is that the turbocharger 20a of FIG. 10 is a common device which is not assisted by an electric motor, and that the boosting device 40 is provided with the electric motor 39 for boosting the pressure at the inlet of the turbocharger 20a in case a transient condition is detected. The embodiments of the present invention shown in FIGS. 4 and 6-9 in addition to the preliminary routine of FIG. 3 are applicable to the turbocharger system shown in FIG. 10. Then, the electric motor 39 of the boosting device 40 of FIG. 10 corresponds to the electric motor 19 of the turbocharger system of FIG. 1.

The electric driven boosting device 40 is installed upstream the compressor 37 of the turbocharger 20a as shown in FIG. 10. However, the electric driven boosting device 40 can be installed downstream of the turbocharger 20a or even downstream of the charge air cooler 9. The electric driven boosting device 40 can be even used without the turbocharger 20a.

In the above-described embodiments, various combinations of parameters are used in the control method. However, the method is not limited to the parameters as defined in the embodiments. Rather, all engine or vehicle related parameters, such as engine rotational speed, the transition period, turbocharger rotational speed or various electric quantities such as the state of charge of power output from the alternator can be freely combined in the same method.

The invention claimed is:

1. A method of operating a boosting device comprising a compressor for compressing inlet air to be supplied to an internal combustion engine and an electric motor for driving said compressor operable by an electric supply system including an alternator and an electric energy storage device, wherein a connection between said alternator and said electric energy storage device is disconnectable, said method comprising the following steps:
   detecting a transient condition wherein said internal combustion engine is required to be accelerated,
   supplying electric energy to said electric motor only from said electric energy storage device at the beginning of said transient condition until a predetermined state is reached with said connection being disconnected,
   supplying electric energy to said electric motor from the electric supply system after said predetermined state is reached,
   monitoring a state of charge of said electric energy storage device, and
   reconnecting said connection when said state of charge is smaller than a predetermined state of charge.

2. A method according to claim 1, wherein said predetermined state is reached after the elapse of a predetermined time period from the beginning of the transient condition.

3. A method according to claim 2, wherein said predetermined time period is substantially 1 second.

4. A method according to claim 1, wherein a rotational speed of said internal combustion engine is detected and said predetermined state is a predetermined rotational speed of said internal combustion engine.

5. A method as in claim 1, 2, 3 or 4, wherein said alternator is driven by said internal combustion engine and generates electric energy for the electric supply system.

6. A method according to claim 1, wherein said alternator is capable of charging said electric energy storage device when said connection is enabled.

7. A method according to claim 1, wherein a power output value of said alternator is monitored and said connection is reconnected when said power output capacity of said alternator is higher than the demand of said electric motor and remaining consumer loads derived from the electric supply system.

8. A method according to claim 1, wherein said connection is connectable and disconnectable by a switch.

9. A method according to claim 1, wherein said compressor comprises a variable nozzle, wherein said nozzle is adjusted based on the state of said connection.

10. A method according to claim 1, wherein said boosting device further comprises an exhaust gas turbine for driving said compressor forming a turbocharger.

11. A method according to claim 10, wherein said exhaust gas turbine comprises a variable nozzle, wherein said nozzle is adjusted based on the state of said connection.

12. A method of operating a boosting device comprising a compressor for compressing inlet air to be supplied to an internal combustion engine and an electric motor for driving said compressor operable by an electric supply system including an alternator and an electric energy storage device, wherein a connection between said alternator and said electric energy storage device is disconnectable, said method comprising the following steps:

detecting a transient condition wherein said internal combustion engine is required to be accelerated,     supplying electric energy to said electric motor only from said electric energy storage device at the beginning of said transient condition until a predetermined state is reached with said connection being disconnected,     supplying electric energy to said electric motor from the electric supply system after said predetermined state is reached,     monitoring a power output value of said alternator, and     reconnecting said connection when said power output capacity of said alternator is higher than the demand of said electric motor and remaining consumer loads derived from the electric supply system.

13. A method according to claim 12, wherein said connection is connectable and disconnectable by a switch.

14. A method according to claim 12, wherein said compressor comprises a variable nozzle, wherein said nozzle is adjusted based on the state of said connection.

15. A method according to claim 12, wherein said boosting device further comprises an exhaust gas turbine for driving said compressor forming a turbocharger and wherein said exhaust gas turbine comprises a variable nozzle, wherein said nozzle is adjusted based on the state of said connection.

16. A method of operating a boosting device comprising a compressor for compressing inlet air to be supplied to an internal combustion engine and an electric motor for driving said compressor operable by an electric supply system including an alternator and an electric energy storage device, wherein a connection between said alternator and said electric energy storage device is disconnectable, and wherein at least one of a variable nozzle of said compressor or a variable nozzle of an exhaust gas turbine of said boosting device is adjusted based on the state of said connection, said method comprising the following steps:

detecting a transient condition wherein said internal combustion engine is required to be accelerated,     supplying electric energy to said electric motor only from said electric energy storage device at the beginning of said transient condition until a predetermined state is reached with said connection being disconnected, and     supplying electric energy to said electric motor from the electric supply system after said predetermined state is reached.

17. A method according to claim 16, wherein said connection is connectable and disconnectable by a switch.

* * * * *